United States Patent
Hata et al.

(10) Patent No.: US 10,399,538 B2
(45) Date of Patent: Sep. 3, 2019

(54) BUCKLE DEVICE

(71) Applicant: KABUSHIKI KAISHA TOKAI-RIKA-DENKI-SEISAKUSHO, Aichi-ken (JP)

(72) Inventors: Yasunori Hata, Aichi-ken (JP); Takuhiro Saito, Aichi-ken (JP); Tatsuhiro Murasaki, Aichi-ken (JP); Yusuke Watada, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 15/410,338

(22) Filed: Jan. 19, 2017

(65) Prior Publication Data
US 2017/0210338 A1    Jul. 27, 2017

(30) Foreign Application Priority Data

Jan. 22, 2016 (JP) ................... 2016-010973

(51) Int. Cl.
*B60R 22/20* (2006.01)
*A44B 11/25* (2006.01)
(Continued)

(52) U.S. Cl.
CPC .......... *B60R 22/20* (2013.01); *A44B 11/2561* (2013.01); *B60R 22/03* (2013.01);
(Continued)

(58) Field of Classification Search
CPC ... B60R 22/195; B60R 22/1952; B60R 22/20; B60R 22/201
See application file for complete search history.

(56) References Cited

U.S. PATENT DOCUMENTS 5,188,425 A * 2/1993 Foster ................. B60R 22/1952
297/473
5,725,249 A * 3/1998 Nishide ............... B60R 22/1952
280/806
(Continued)

FOREIGN PATENT DOCUMENTS

DE    4228146 A1 * 3/1994 ......... B60R 22/1952
JP    2003-025955 A    1/2003
(Continued)

OTHER PUBLICATIONS

Office Action issued in the corresponding Japanese patent application No. 2017-008704 on Dec. 12, 2017.

*Primary Examiner* — Nicole T Verley
(74) *Attorney, Agent, or Firm* — Roberts Mlotkowski Safran Cole & Calderon, P.C.

(57) ABSTRACT

In a buckle device, a pressing force, applied from wire ropes to an inside wall face of a wire guide groove of a wire guide, is along an imaginary line passing through a center of a cover plate first hole portion of a cover plate fixing tab of a cover plate and a center of a wire guide hole portion of the wire guide as viewed from the vehicle inside, similarly to a pressing force applied to a first fixing bolt that fixes the cover plate to a support plate, and these pressing forces are both oriented in the same direction. This enables rotation moment to be suppressed from occurring at the cover plate when the wire ropes are pulled toward their length direction leading end side.

7 Claims, 6 Drawing Sheets (51) Int. Cl.
  *B60R 22/04*     (2006.01)
  *B60R 22/22*     (2006.01)
  *H02K 7/14*      (2006.01)
  *B60R 22/03*     (2006.01)
  *B60R 22/18*     (2006.01)

(52) U.S. Cl.
  CPC ............. *B60R 22/04* (2013.01); *B60R 22/22* (2013.01); *H02K 7/14* (2013.01); *B60R 2022/1806* (2013.01)

(56) References Cited

U.S. PATENT DOCUMENTS

| | | | |
|---|---|---|---|
| 7,188,868 B2* | 3/2007 | Yamaguchi | B60R 22/195 |
| | | | 280/806 |
| 9,527,472 B2* | 12/2016 | Shimazu | B60R 22/20 |
| 2003/0030264 A1* | 2/2003 | Motozawa | B60R 22/1952 |
| | | | 280/806 |
| 2010/0052302 A1* | 3/2010 | Bok | B60R 22/1955 |
| | | | 280/806 |
| 2015/0008718 A1* | 1/2015 | Inagawa | B60R 22/18 |
| | | | 297/480 |

FOREIGN PATENT DOCUMENTS

| | | | | |
|---|---|---|---|---|
| JP | 2009-113723 A | | 5/2009 | |
| JP | WO-2013125486 A1 * | | 8/2013 | ............ B60R 22/18 |
| JP | 2015-044460 | | 3/2015 | |
| JP | 2015044460 A * | | 3/2015 | |
| KR | 101366609 B1 * | | 2/2014 | |

\* cited by examiner

BUCKLE DEVICE

CROSS-REFERENCE TO RELATED APPLICATION

This application claims priority under 35 USC 119 from Japanese Patent Application No. 2016-010973 filed Jan. 22, 2016, the disclosure of which is incorporated by reference herein.

BACKGROUND

Field of the Invention

The present invention relates to a buckle device that is capable of moving a buckle by driving a drive section.

Related Art

Buckle devices exist in which a length direction intermediate portion of a moving member configured by a wire or the like is bent around an intermediate member, the moving member is moved in the length direction of the moving member by drive force of a drive section, and a buckle provided at a length direction leading end portion of the moving member is moved accordingly (see, for example, Japanese Patent Application Laid-Open (JP-A) No. 2015-44460).

In such buckle devices, in a case in which a coupling member is provided between the intermediate member and the vehicle side, and the intermediate member is fixed to the vehicle side via the coupling member, rotation moment sometimes occurs at the coupling portion between the coupling member and the intermediate member when the moving member is pulled toward its length direction leading end side and the intermediate member receives load from the moving member.

SUMMARY

In consideration of the above circumstances, a buckle device capable of suppressing rotation moment from occurring at a coupling portion between a coupling member and an intermediate member when a moving member is pulled toward its length direction leading end side is obtained.

A buckle device of a first aspect includes: a buckle that is configured to engage with a tongue provided at webbing of a seatbelt device; a moving member whose leading end side in a length direction of the movement member is anchored to the buckle; a drive section that, by drive force which the drive section outputs, moves a base end portion in the length direction of the moving member along the length direction of the moving member to move the buckle; an intermediate member at which an intermediate portion in the length direction of the movement member is disposed, and at which the moving member is bent; and a coupling member that includes a first coupling section which is coupled to a vehicle side support section and a second coupling section to which the intermediate member is coupled and retained, wherein a direction of load acting on the first coupling section due to the moving member being pulled toward the leading end side in the length direction is along a direction of load acting on the second coupling section due to the moving member being pulled toward the leading end side in the length direction.

In the buckle device of the first aspect, the first coupling section of the coupling member is coupled to the vehicle side support section, and the intermediate member is coupled to and retained by the second coupling section of the coupling member. Note that the direction of load acting on the first coupling section due to the moving member being pulled toward the leading end side in the length direction is along the direction of load acting on the second coupling section due to the moving member being pulled toward the leading end side in the length direction. This enables rotation moment to be suppressed from occurring at the second coupling section of the coupling member.

A buckle device of a second aspect is the buckle device of the first aspect, wherein: a portion of the first coupling section where load acts and a portion of the second coupling section where load acts, due to the moving member being pulled toward the leading end side in the length direction, are single in the first coupling section and the second coupling section respectively, and the portion of the second coupling section where load acts is disposed in the direction of load acting on the first coupling section with respect to the portion of the first coupling section where load acts.

In the buckle device of the second aspect, the portion of the first coupling section of the coupling member where load acts and the portion of the second coupling section of the coupling member where load acts due to (when) the moving member being pulled toward the length direction leading end side are each single. Note that the portion of the second coupling section of the coupling member where load acts is disposed with respect to the portion of the first coupling section of the coupling member where load acts in the direction of the load acting on the first coupling section of the coupling member. This enables rotation moment to be effectively suppressed from occurring at the second coupling section of the coupling member due to (when) the moving member being pulled toward the length direction leading end side.

A buckle device of a third aspect is the buckle device of the first aspect, wherein at least one of the first coupling section or the second coupling section includes a plurality of portions where load acts due to the moving member being pulled toward the leading end side in the length direction, and a direction of a resultant force of loads at the respective plurality of portions is along a direction of load applied from the moving member to the intermediate member.

In the buckle device of the third aspect, at least one of the first coupling section of the coupling member or the second coupling section of the coupling member has plural portions where load acts when the moving member is pulled toward the length direction leading end side. Note that the direction of the resultant force of loads at the respective plural portions runs along the direction of load applied from the moving member to the intermediate member. This enables rotation moment to be effectively suppressed from occurring at the second coupling section of the coupling member.

As explained above, the buckle device according to the aspects is capable of suppressing rotation moment from occurring at a coupling portion between the coupling member and the intermediate member when the moving member is pulled toward its length direction leading end side.

BRIEF DESCRIPTION OF THE DRAWINGS

Exemplary embodiments will be described in detail based on the following figures, wherein.

DETAILED DESCRIPTION

Explanation follows regarding exemplary embodiments, based on FIG. 1 to FIG. 6. Note that in each of the drawings, the arrow FR indicates the vehicle front side, the arrow OUT indicates the vehicle width direction outside, and the arrow UP indicates the vehicle upper side of a location where a buckle device 10 is applied.

Configuration of Present Exemplary Embodiment

Figure 1:
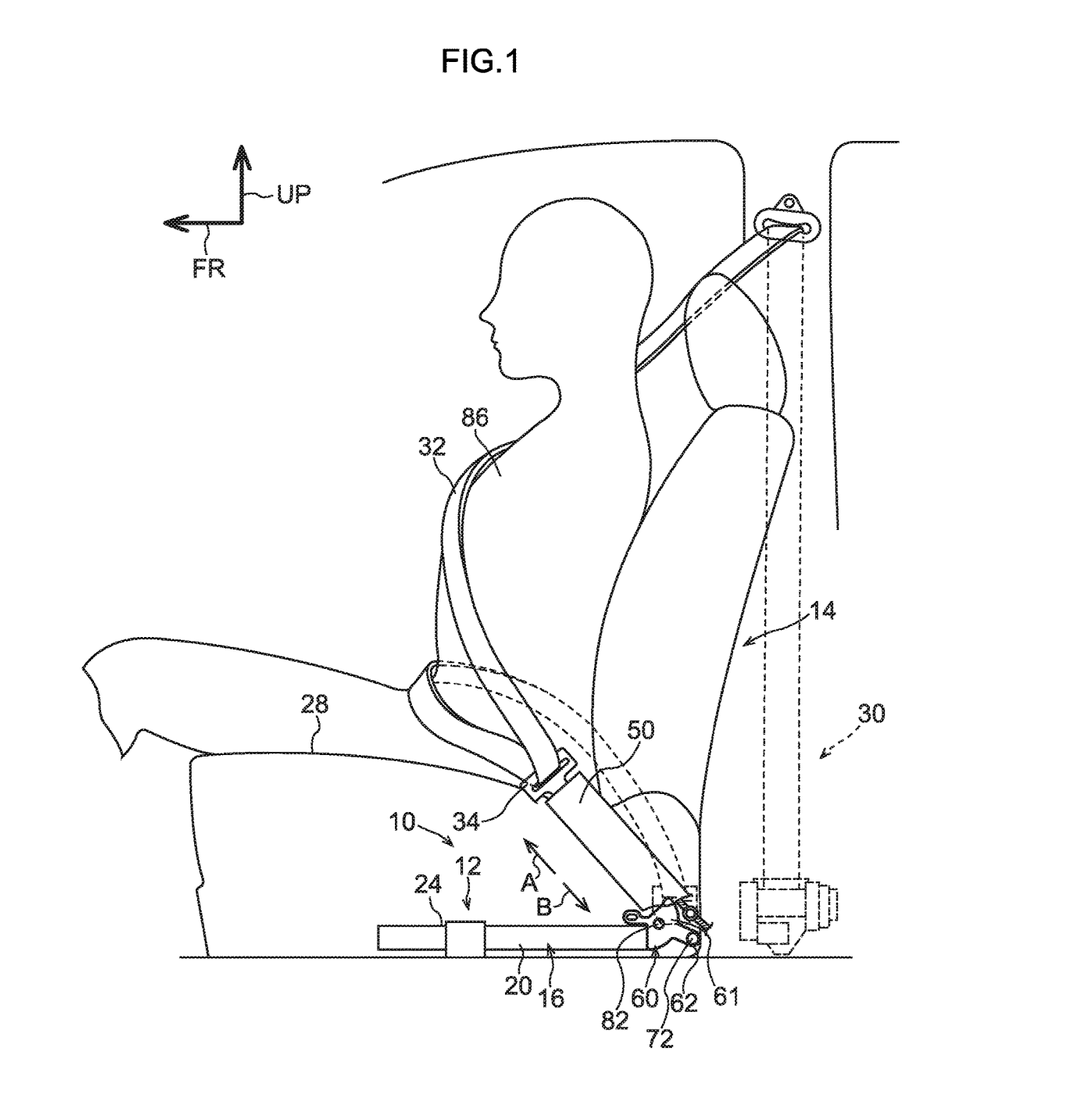
FIG. 1 is a side view of a seat applied with a buckle device according to a first exemplary embodiment, as viewed from the vehicle width direction inside.
Figure 2:
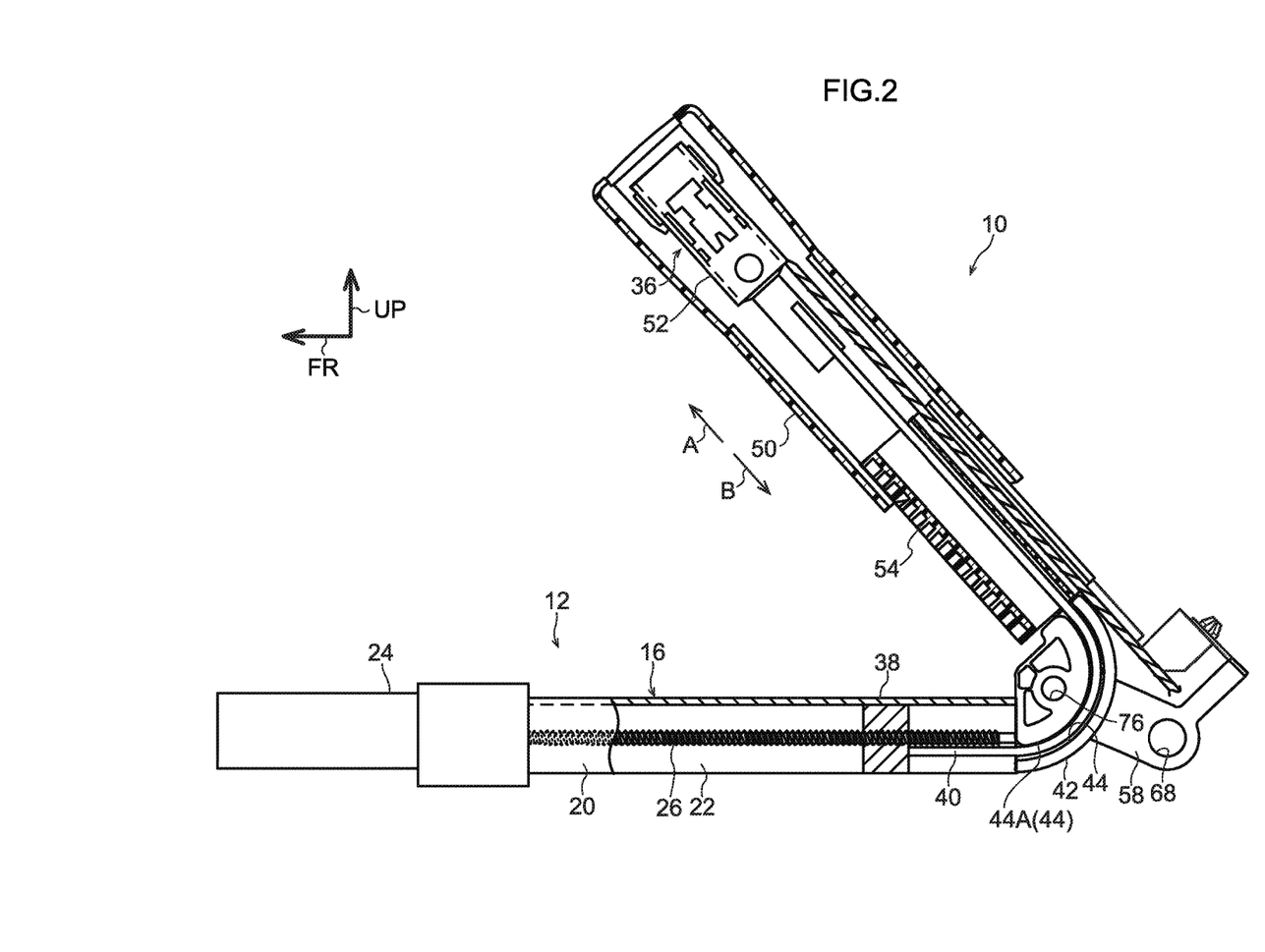
FIG. 2 is a side cross-section of a buckle device according to the first exemplary embodiment with a cover plate removed.

As illustrated in FIG. 1, the buckle device 10 includes a buckle drive device 12 serving as a drive section. The buckle drive device 12 is provided at the vehicle width direction inside of a seat 14 applied with the buckle device 10. The buckle drive device 12 includes a guide rail 16 serving as a slider guiding mechanism. The guide rail 16 is fixed to the vehicle body side, such as a floor section of the vehicle body of the vehicle, by a fastener such as a bolt. As illustrated in FIG. 2, the guide rail 16 includes a pair of guide walls 20 and 22 that face each other in the vehicle width direction and serve as slider guiding section. A drive screw 26 serving as a drive member is provided between the guide walls 20 and 22. The central axial direction of the drive screw 26 extends along the vehicle front-rear direction, and the drive screw 26 is capable of rotating about its central axis.

A motor actuator 24, serving as a drive force output unit, is provided at the vehicle front side of the guide rail 16. A vehicle front side end portion of the drive screw 26 is coupled to the motor actuator 24, and the drive screw 26 is rotated about the central axis of the drive screw 26 by drive force output from a motor of the motor actuator 24. The motor actuator 24 is electrically connected to a controller (not illustrated in the drawings) such as a motor driver or an ECU. The controller is electrically connected to a detector, such as a door opening and closing detector such as a courtesy switch that detects opening and closing of a vehicle door corresponding to the seat 14 applied with the buckle device 10, and/or an occupant detector such as a load sensor provided to a seat cushion 28 of the seat 14. The controller is also electrically connected to a buckle switch (also not illustrated in the drawings) that detects when a tongue 34 provided to webbing 32 of a seatbelt device 30 illustrated in FIG. 1 has engaged with a buckle 36 (see FIG. 2) of the buckle device 10, described later. The motor actuator 24 is controlled based on electrical signals output from the detector, such as the door opening and closing detector, the occupant detector, the buckle switch, and the like.

As illustrated in FIG. 2, a slider 38 is provided between the guide wall 20 and the guide wall 22 of the guide rail 16. The slider 38 is formed in a block shape. As illustrated in FIG. 2, vehicle width direction side faces of the slider 38 abut the guide walls 20 and 22 of the guide rail 16. A thread hole which the drive screw 26 pierces through is formed in the slider 38. The slider 38 is guided by the guide walls 20 and 22 so as to slide along the vehicle front-rear direction due to the drive screw 26 rotating.

Figure 5:
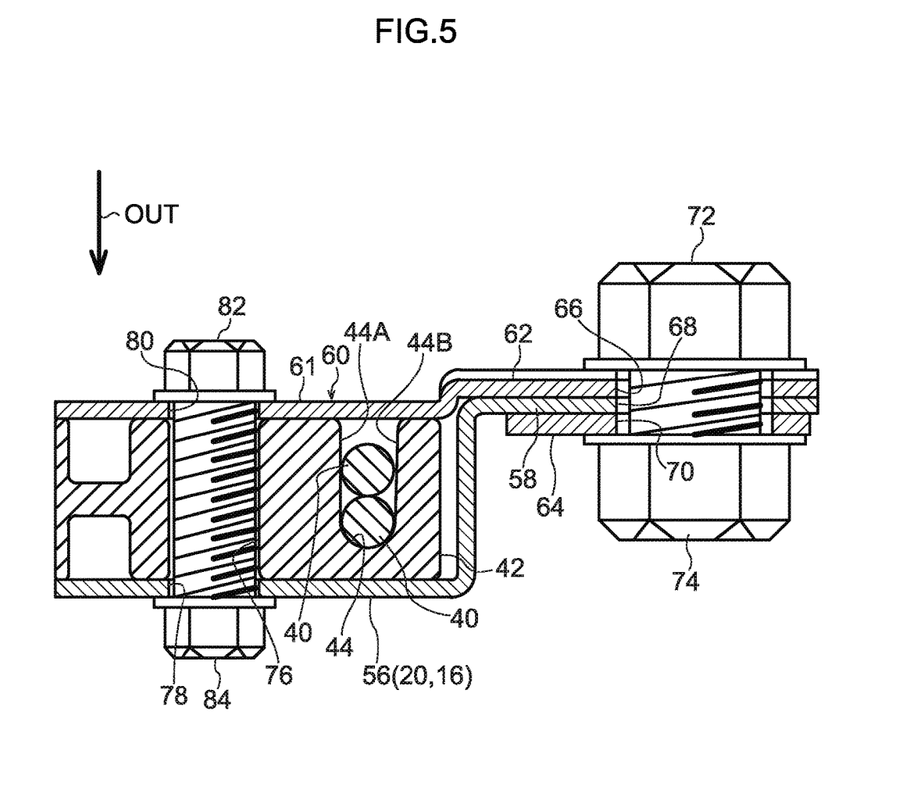
FIG. 5 is a cross-section sectioned along an imaginary line L1 in FIG. 3 and viewed from the vehicle lower side.

As illustrated in FIG. 2, the buckle device 10 includes two wire ropes 40 serving as moving member configuring a movement section (one of the wire ropes 40 corresponds to the movement section at one side, and another of the wire ropes 40 corresponds to the movement section at another side). The wire ropes 40 are each formed in an elongated shape, and, as illustrated in FIG. 5, are provided side by side in the vehicle width direction (the width direction of the seat 14). As illustrated in FIG. 2, at the side of the wire ropes 40 that is further toward respective base ends than length direction intermediate portions thereof, the length direction of the wire ropes 40 runs along the vehicle front-rear direction, and respective length direction base end portions of the wire ropes 40 are coupled to the slider 38 at a location further toward the vehicle lower side than the drive screw 26. Thus, the wire ropes 40 are moved along their length direction when the slider 38 slides along the vehicle front-rear direction.

A wire guide 42 serving as an intermediate member is provided at the vehicle rear side of the guide rail 16. A wire guide groove 44 serving as a groove portion (abut portion) is formed in the wire guide 42. The wire guide groove 44 is open at an inside face in the vehicle width direction of the wire guide 42. One end of the wire guide groove 44 in a length direction thereof is open at a vehicle front side face of the wire guide 42, an intermediate portion of the wire guide groove 44 in the length direction thereof is curved about an axis, an axial direction thereof being along the vehicle width direction, and another end of the wire guide groove 44 in the length direction thereof is open at a vehicle upper side face of the wire guide 42. The wire ropes 40 are passed through the wire guide groove 44. The wire ropes (intermediate portions) 40 are bent (curved) (so, bent portions (curved portions) are formed) around an axis, an axial direction thereof being along the vehicle width direction (the width direction of the seat 14), so as to follow the wire guide groove 44 of the wire guide 42. The wire ropes 40, that are further toward the respective leading ends than the opening at the vehicle upper side face of the wire guide 42, extend diagonally toward the vehicle upper front side (see the arrow A direction in FIG. 2).

The buckle device 10 includes a buckle cover 50. The buckle cover 50 has a tube shape with its length direction in directions (the arrow A direction and the arrow B direction in FIG. 2) sloping in the vehicle front-rear direction with respect to the vehicle up-down direction. The buckle 36 is provided in a vehicle upper side portion inside the buckle cover 50. The buckle 36 includes a buckle body 52. The buckle body 52 is formed with a U-shaped cross-section profile open toward the vehicle width direction outside. Configuration components (not illustrated in the drawings) of the buckle 36, such as a latch, are provided inside the buckle body 52. When the tongue 34 provided at the webbing 32 of the seatbelt device 30 illustrated in FIG. 1 is inserted diagonally into the buckle body 52 from the vehicle upper front side of the buckle body 52, the latch provided at the buckle body 52 enters a hole portion formed in the tongue 34, and the tongue 34 engages with the buckle 36 accordingly.

As illustrated in FIG. 2, the buckle device 10 includes a buckle guide 54. The buckle guide 54 is formed using a synthetic resin material that is softer than the buckle cover 50. The buckle guide 54 has a long tube shape running along the length direction of the buckle cover 50 (the arrow A direction and the arrow B direction in FIG. 2). A portion of the of the buckle guide 54 that is diagonally at the vehicle lower rear side is coupled to the guide rail 16. The buckle guide 54 is inserted into the buckle cover 50 from an end portion of the buckle cover 50 that is diagonally at the vehicle lower rear side. The buckle cover 50 is thereby capable of moving diagonally toward the vehicle upper front side (the arrow A direction in FIG. 2) and diagonally toward the vehicle lower rear side (the arrow B direction in FIG. 2) guided by the buckle guide 54.

The wire ropes 40 are passed through inside the buckle guide 54. The leading end side in the length direction of the wire ropes 40 extends from an end portion that is diagonally at the vehicle upper front side of the buckle guide 54 toward the outside of the buckle guide 54, and is coupled to the buckle body 52 provided to the buckle cover 50. Thus, when the leading end portions in the length direction of the wire ropes 40 are moved diagonally toward the vehicle upper front side (the arrow A direction in FIG. 2) due to the wire ropes 40 being moved toward their length direction leading end side, the buckle 36 is moved diagonally toward the vehicle upper front side accompanying the buckle cover 50. In contrast thereto, when the leading end portions in the length direction of the wire ropes 40 are moved diagonally toward the vehicle lower rear side (the arrow B direction in FIG. 2) due to the wire ropes 40 being moved toward their length direction base end side, the buckle 36 is moved diagonally toward the vehicle lower rear side accompanying the buckle cover 50.

As illustrated in FIG. 5, an extension tab 56 extending out from a vehicle rear side end portion of the guide wall 20 of the guide rail 16 is disposed at the vehicle width direction outside of the above-described wire guide 42. The extension tab 56 is bent toward the vehicle width direction inside at the vehicle rear side of the wire guide 42. A guide rail fixing tab 58 illustrated in FIG. 5 extends out diagonally toward the vehicle lower rear side from a vehicle width direction inside end portion of a part of the extension tab 56, which part is bent toward the vehicle width direction inside.

Figure 3:
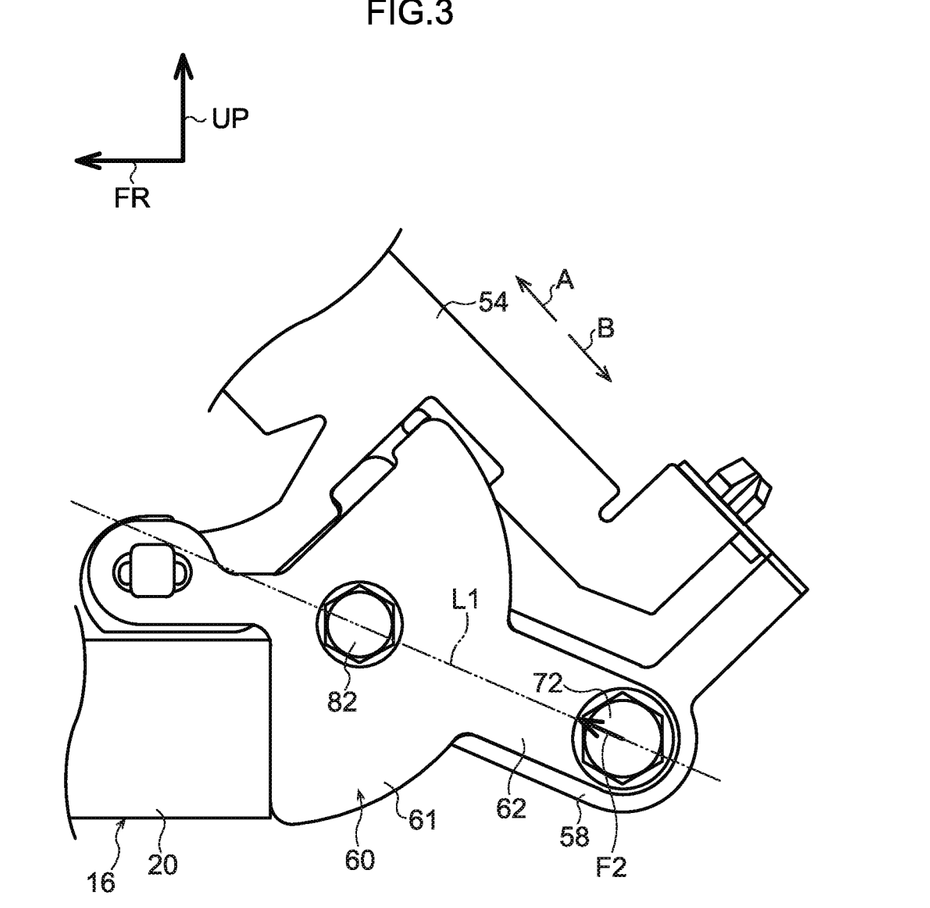
FIG. 3 is an enlarged side view of a cover plate of a buckle device according to the first exemplary embodiment and the vicinity thereof.

As illustrated in FIG. 1 and FIG. 3, a cover plate 60 serving as a coupling member is provided at the vehicle width direction inside of the wire guide 42. The cover plate 60 is provided with a cover plate main body 61 serving as a second coupling section. The wire guide groove 44 of the wire guide 42 is closed off from the vehicle width direction inside by the cover plate main body 61 of the cover plate 60. As illustrated in FIG. 3, the cover plate 60 is provided with a cover plate fixing tab 62 serving as a first coupling section. The cover plate fixing tab 62 extends out diagonally toward the vehicle lower rear side from the cover plate main body 61 of the cover plate 60. The cover plate fixing tab 62 of the cover plate 60 faces the guide rail fixing tab 58 at the vehicle width direction inside of the guide rail fixing tab 58 of the guide rail 16. As illustrated in FIG. 5, a support plate 64, which is provided at the floor section of the vehicle body of the vehicle, is disposed at the vehicle width direction outside of the guide rail fixing tab 58 of the guide rail 16.

A cover plate first hole portion 66 is formed in the cover plate fixing tab 62 of the cover plate 60, a guide rail fixing tab hole portion 68 is formed in the guide rail fixing tab 58 of the guide rail 16, and a support plate hole portion 70 is formed in the support plate 64 of the floor section of the vehicle body of the vehicle. The cover plate first hole portion 66, the guide rail fixing tab hole portion 68, and the support plate hole portion 70 all face in the vehicle width direction. A first fixing member (bolt) 72 is disposed piercing through the cover plate first hole portion 66, the guide rail fixing tab hole portion 68, and the support plate hole portion 70. A first nut 74 is screwed onto a leading end portion of the first fixing bolt 72. The cover plate fixing tab 62 of the cover plate 60 and the guide rail fixing tab 58 of the guide rail 16 are thereby fixed to the support plate 64 of the floor section of the vehicle body of the vehicle.

Figure 4:
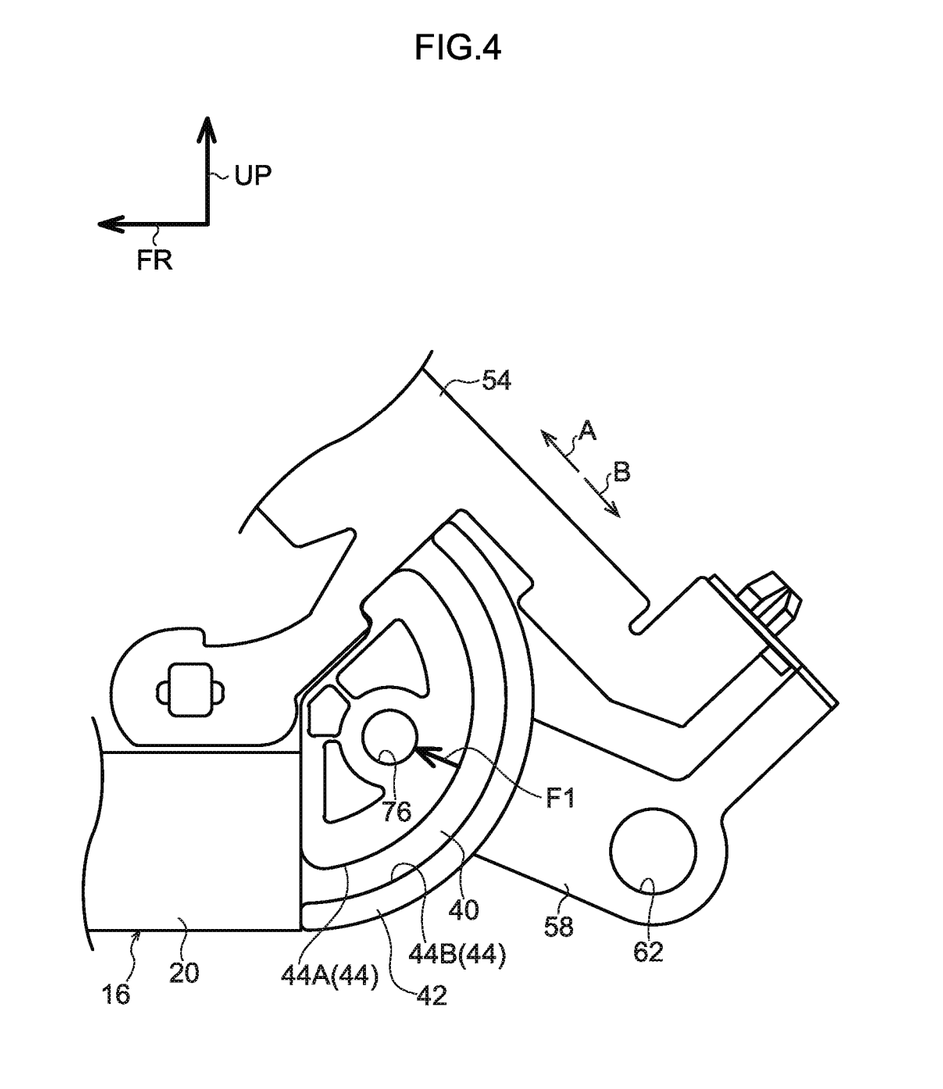
FIG. 4 is an enlarged side view of a wire guide of a buckle device according to the first exemplary embodiment and the vicinity thereof.

As illustrated in FIG. 4, a wire guide hole portion 76 is formed in a portion of the wire guide 42, the portion is at further toward the inside in the direction of the radius of curvature of the wire guide groove 44 than the wire guide groove 44. As illustrated in FIG. 5, the wire guide hole portion 76 of the wire guide 42 pierces through in the vehicle width direction. The above-described extension tab 56 of the guide rail 16 is disposed at the vehicle width direction outside of the wire guide hole portion 76 of the wire guide 42. An extension tab hole portion 78 is formed in the extension tab 56. The extension tab hole portion 78 of the extension tab 56 faces the wire guide hole portion 76 of the wire guide 42 in the vehicle width direction. A cover plate second hole portion 80, formed in the cover plate main body 61 of the cover plate 60, faces the wire guide hole portion 76 at the vehicle width direction inside of the wire guide hole portion 76 of the wire guide 42.

As illustrated in FIG. 5, a second fixing member (bolt) 82 is disposed piercing through the wire guide hole portion 76 of the wire guide 42, the extension tab hole portion 78 of the extension tab 56 of the guide rail 16, and the cover plate second hole portion 80 of the cover plate 60. A second nut 84 is screwed onto a leading end portion of the second fixing bolt 82. Thus, the wire guide 42 is fixed to the cover plate 60 and the extension tab 56 of the guide rail 16, and further the wire guide 42 is fixed, via the cover plate 60 and the extension tab 56 of the guide rail 16, to the support plate 64 provided at the floor section of the vehicle body of the vehicle.

Note that in the present exemplary embodiment, an angle formed by an imaginary line L1 passing through the center of the wire guide hole portion 76 of the wire guide 42 and the center of the cover plate first hole portion 66 of the cover plate 60, with respect to the length direction of the wire ropes 40 (the arrow FR direction and the opposite direction thereto in FIG. 3) at the side of the wire ropes 40 further toward their length direction base end side than the wire guide 42, is substantially ½ of an angle formed by the length direction of the wire ropes 40 (the arrow A direction and the arrow B direction in FIG. 3) at the side of the wire ropes 40 further toward their length direction leading end side than the wire guide 42, with respect to the length direction of the wire ropes 40 (the arrow FR direction and the opposite direction thereto in FIG. 3) at the side of the wire ropes 40 further toward their length direction base end side than the wire guide 42. In a case in which the wire ropes 40 are pulled toward their length direction leading end side, the imaginary line L1 is (runs) along the direction of a pressing force F1 which is received from the wire ropes 40 by an inside wall face 44A, this inside wall face 44A being a wall face disposed at the inner side of bent portions of the wire ropes 40 (at the inner side of bend-curve of the wire ropes 40 in FIG. 2) (namely, the inside wall face 44A is located at a side of center-of-curvature of bending of the bent portions of the wire ropes 40 with respect to the wire ropes 40).

Operation and Advantageous Effects of First Exemplary Embodiment

In the buckle device 10, when the vehicle door corresponding to the seat 14 applied to the buckle device 10 is changed from a closed state to an open state, for example, this change in the open and closed states of the door is detected by a detector such as a door opening and closing detector such as a courtesy switch. When an occupant 86 then sits on the seat 14, for example, this seating of the occupant 86 on the seat 14 is detected by a detector such as an occupant detector such as a load sensor provided at the seat cushion 28 of the seat 14 or the like. The level of electrical signal(s) output from the detector(s) to the controller is changed by the change in the state of the door and/or the seat 14 accompanying the occupant boarding the vehicle in this manner. When the motor actuator 24 is accordingly driven to rotate the drive screw 26, the slider 38 is guided by the guide walls 20 and 22 of the guide rail 16 and slides toward the vehicle rear side. When the wire ropes 40 are accordingly moved toward their length direction leading end side, the buckle body 52 is pressed diagonally toward the vehicle upper front side by the wire ropes 40.

When pressing force from the wire ropes 40 is transmitted to the buckle cover 50 through the buckle body 52, then, as illustrated in FIG. 2, the buckle cover 50 is guided by the buckle guide 54 and moved diagonally toward the vehicle upper front side (the arrow A direction side in FIG. 2). Due to the buckle cover 50 being moved in this manner, the occupant 86 can easily engage the tongue 34 with the buckle 36, and can easily put on the webbing 32.

When the tongue 34 engages with the buckle 36, the level of electrical signal output from the buckle switch of the buckle 36 to the controller changes. When the motor actuator 24 is accordingly driven to rotate the drive screw 26, the slider 38 is guided by the guide walls 20 and 22 of the guide rail 16 and slides toward the vehicle front side. When the wire ropes 40 are moved toward their length direction base end side accordingly, the buckle cover 50 is pulled through the buckle body 52 by the wire ropes 40. Thus, the buckle cover 50 is guided by the buckle guide 54, and, as illustrated in FIG. 1, the buckle cover 50 is moved diagonally toward the vehicle lower rear side (the arrow B direction in FIG. 3).

When the vehicle suddenly decelerates during a vehicle collision or the like, the webbing 32 that is worn on the body of the occupant 86 seated in the seat 14 is pulled by the body of the occupant 86. When the buckle 36 of the buckle device 10 is accordingly pulled diagonally toward the vehicle upper front side by the tongue 34 provided at the webbing 32, the length direction leading end side of the wire ropes 40 coupled to the buckle 36 of the buckle device 10 are also pulled diagonally toward the vehicle upper front side.

When the length direction leading end side of the wire ropes 40 is pulled diagonally toward the vehicle upper front side in this manner, the side of the wire ropes 40, that is further toward the length direction base end than the wire guide 42, is pulled toward the vehicle rear side. However, the length direction base end portions of the wire ropes 40 are retained by the slider 38, and so movement of the length direction base end portions of the wire ropes 40 toward the vehicle rear side is prevented. Thus, reaction force against the pulling force applied to the length direction leading end side of the wire ropes 40 acts on the length direction base end portions of the wire ropes 40. In this state, the inside wall face 44A of the wire guide groove 44 of the wire guide 42 is pressed by the wire ropes 40.

Thus, when the inside wall face 44A of the wire guide groove 44 of the wire guide 42 receives a pressing force F1 (see FIG. 4) from the wire ropes 40 in this manner, a shaft portion (thread portion) of the second fixing bolt 82 disposed piercing through the wire guide hole portion 76 of the wire guide 42 is pressed by an inner peripheral portion of the wire guide hole portion 76 of the wire guide 42, and the cover plate second hole portion 80 of the cover plate main body 61 of the cover plate 60 is pressed by the shaft portion (thread portion) of the second fixing bolt 82. Due thereto, the first fixing bolt 72 disposed piercing through the cover plate first hole portion 66 of the cover plate fixing tab 62 of the cover plate 60 receives a pressing force F2 (see FIG. 3) from an inner peripheral portion of the cover plate first hole portion 66 of the cover plate fixing tab 62 of the cover plate 60.

However, the first fixing bolt 72 is fixed to the support plate 64 provided at the floor section of the vehicle body of the vehicle, and the wire guide 42 is accordingly fixed to the floor section of the vehicle body via the cover plate 60. This enables movement of the wire guide 42 to be suppressed when the wire ropes 40 are pulled toward their length direction leading end side.

As viewed from the vehicle width direction inside, the pressing force F1 applied from the wire ropes 40 to the inside wall face 44A of the wire guide groove 44 of the wire guide 42 is (runs) along the imaginary line L1 passing through the center of the wire guide hole portion 76 of the wire guide 42 (the center of the cover plate second hole portion 80) and the center of the cover plate first hole portion 66 of the cover plate fixing tab 62 of the cover plate 60. In other words, the direction of load acting on the cover plate second hole portion 80 of the cover plate main body 61 (the second coupling section) of the cover plate 60 is along the imaginary line L1 (on the imaginary line L1).

As also viewed from the vehicle width direction inside, the pressing force F2 (as mentioned above, the first fixing bolt 72 receives the pressing force F2 from the inner peripheral portion of the cover plate first hole portion 66 of the cover plate fixing tab 62 of the cover plate 60) applied, from the support plate 64, which fixes thereto the cover plate 60, on the floor section of the vehicle body of the vehicle, to the first fixing bolt 72 that fixes the cover plate 60 to the support plate 64, also is (runs) along the imaginary line L1. In other words, the direction of load acting on the cover plate first hole portion 66 of the cover plate fixing tab 62 (the first coupling section) of the cover plate 60 is along the imaginary line L1 (on the imaginary line L1).

Thus, the direction of the pressing force F2 and the direction of the pressing force F1 are the same directions.

Thus, even when the wire ropes 40 are pulled toward their length direction leading end side and the pressing force F2 acts on the cover plate 60, generation of rotation moment (torque) (such as rotation moment about the central axis of the first fixing bolt 72 that fixes the cover plate 60 to the support plate 64) at the cover plate 60 can be suppressed. This enables rotation force based on this rotation moment to be suppressed from acting on the second fixing bolt 82 that couples the wire guide 42 to the cover plate 60, and enables a substantially stable load to be input to the second fixing bolt 82 when the wire ropes 40 are pulled toward their length direction leading end side. This facilitates selection of the mechanical strength of the second fixing bolt 82, for example.

Thus, there is no need to especially increase the mechanical strength of the second fixing bolt 82 or the like, or to provide a separate member to the second fixing bolt 82 in order to couple the wire guide 42 to the cover plate 60. This enables an increase in the number of components, such as bolts, to be suppressed, enables the buckle device 10 to be made more compact, and enables the ease of installation of the buckle device 10 in the vehicle to be improved, enabling the buckle device 10 to be assembled to a frame member of the seat 14, for example.

Second Exemplary Embodiment

Explanation follows regarding a second exemplary embodiment. Note that when explaining the second exemplary embodiment, locations that are basically the same as those in the first exemplary embodiment are appended with the same reference numerals, and detailed explanation thereof is omitted.

Figure 6:
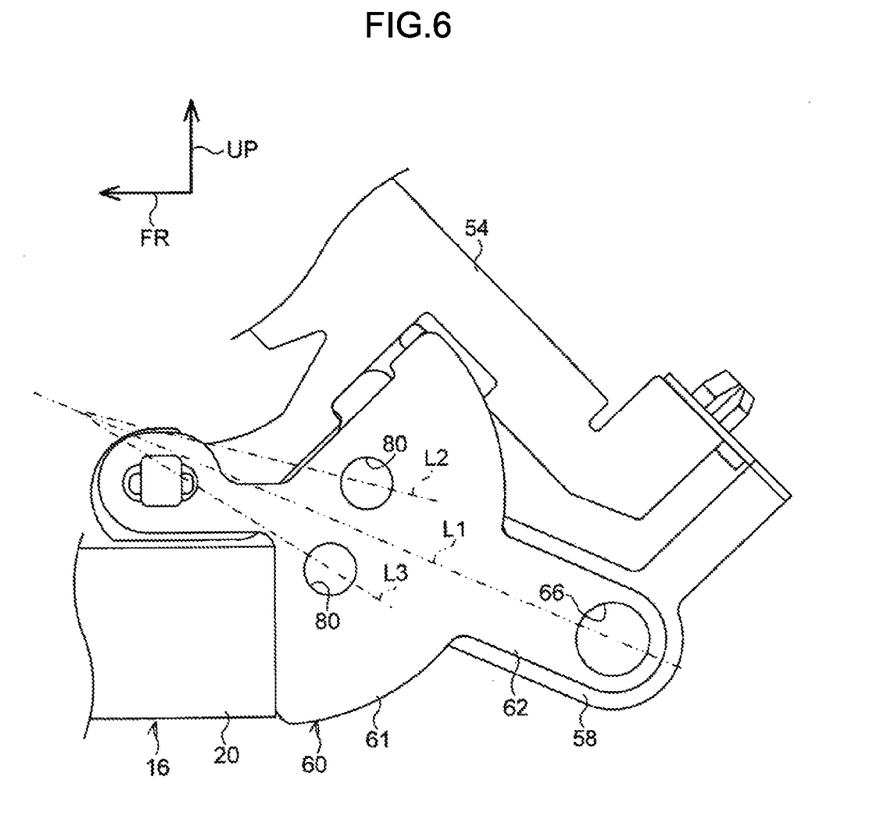
FIG. 6 is an enlarged side view of a cover plate of a buckle device according to a second exemplary embodiment and the vicinity thereof.

As illustrated in FIG. 6, in the present exemplary embodiment, plural cover plate second hole portions 80 are provided in the cover plate 60. Although not illustrated in FIG. 6, plural wire guide hole portions 76 are formed in the wire guide 42 and plural extension tab hole portions 78 are formed in the extension tab 56 of the guide rail 16, corresponding to the respective cover plate second hole portions 80 of the cover plate 60. Although not illustrated in FIG. 6, second fixing bolts 82 are disposed piercing through the respective cover plate second hole portions 80 of the cover plate 60.

Note that as viewed from the vehicle width direction inside, an angle formed by a single-dotted dashed line L2 that passes through the center of one of the cover plate second hole portions 80 of the cover plate 60 and that intersects the imaginary line L1, and by the imaginary line L1, is set at the same size as an angle formed by a single-dotted dashed line L3 that passes through the center of another of the cover plate second hole portions 80 of the cover plate 60 and passes through a portion where the imaginary line L1 and the single-dotted dashed line L2 intersect, and by the imaginary line L1. Thus, when the wire ropes 40 are pulled toward their length direction leading end side, the resultant force of loads applied, from the inner peripheral portions of the respective cover plate second hole portions 80 of the cover plate 60, to the respective second fixing bolts 82 disposed piercing through the respective cover plate second hole portions 80, is (runs) along the imaginary line L1, and is in the same direction as the pressing force F2 applied, from the support plate 64 to the first fixing bolt 72 that fixes the cover plate 60 to the support plate 64.

Thus, in the present exemplary embodiment also, even when the wire ropes 40 are pulled toward their length direction leading end side and the pressing force F2 is applied to the cover plate 60, rotation moment (such as rotation moment about the central axis of the first fixing bolt 72 that fixes the cover plate 60 to the support plate 64) at the cover plate 60 can be suppressed from occurring. This enables rotation force based on this rotation moment to be suppressed from acting on the second fixing bolts 82 that couple the wire guide 42 to the cover plate 60, and enables substantially stable load to be input to the second fixing bolts 82 when the wire ropes 40 are pulled toward their length direction leading end side. This facilitates selection of the mechanical strength of the second fixing bolts 82, for example.

Thus, there is no need to especially increase the mechanical strength of the second fixing bolts 82 or the like, or to provide a separate member to the second fixing bolts 82 in order to couple the wire guide 42 to the cover plate 60. This enables an increase in the number of components, such as bolts, to be suppressed, enables the buckle device 10 to be made more compact, and enables the ease of installation of the buckle device 10 in the vehicle to be improved, enabling the buckle device 10 to be assembled to a frame member of the seat 14, for example.

Note that the present exemplary embodiment is configured such that plural cover plate second hole portions 80 are formed in the cover plate 60; however, configuration may be such that plural cover plate fixing tabs 62 are provided at the cover plate 60, and cover plate first hole portions 66 are provided in each of the cover plate fixing tabs 62, such that the resultant force of loads applied, from inner peripheral portions of the respective cover plate first hole portions 66, to the respective first fixing bolts 72 disposed piercing through the respective cover plate first hole portions 66 is positioned on the imaginary line L1.

What is claimed is:
1. A buckle device configured to be mounted in a vehicle, comprising:
a buckle that is configured to engage with a tongue provided at webbing of a seatbelt device;
a moving member whose leading end side in a length direction of the movement member is anchored to the buckle;
a drive section that, by drive force which the drive section outputs, moves a base end side portion in the length direction of the moving member along the length direction of the moving member to move the buckle;
a guide rail member attached to a body of the vehicle that guides the moving member;
an intermediate member fixed to the guide rail and having an engagement surface at which an intermediate portion in the length direction of the movement member is disposed, and at which the moving member is bent; and
a coupling member that includes a first coupling section which is fixed to a vehicle side support section that is attached to the body of the vehicle, and a second coupling section to which the intermediate member is fixed and retained,
wherein the first coupling section and the second coupling section of the coupling member and the intermediate member are fixedly mounted relative to the body of the vehicle via the vehicle side support section such that the bent portion of the moving member slidably moves over the engagement surface of the intermediate member when the drive section moves the moving member,
wherein a direction of a first load acting on the first coupling section due to the moving member being pulled toward the leading end side in the length direction and a direction of a second load acting on the second coupling section due to the moving member being pulled toward the leading end side in the length direction are the same as an extending direction of a single imaginary line L1, and the first load and the second load act on the single imaginary line L1,
wherein the intermediate member is non-rotatably fixed to the second coupling section such that the intermediate member is fixedly and non-rotatably mounted relative to the body of the vehicle,
wherein the moving member is a member which is continuous from the leading end side thereof via the intermediate portion thereof to the base end side portion thereof,
wherein a first hole portion is formed at the first coupling section, and a support hole portion is formed at the vehicle side support section,
wherein a first fixing member is inserted in the first hole portion and the support hole portion such that the first coupling section is fixed to the vehicle side support section,
wherein a second hole portion is formed at the second coupling section, and an intermediate member hole portion is formed at the intermediate member, wherein a second fixing member is inserted in the second hole portion and the intermediate member hole portion such that the second coupling section is fixed to the intermediate member, wherein the first coupling section and the second coupling section configure a single member as the coupling member, wherein the single imaginary line L1 is a straight line passing through the first fixing member inserted in the first hole portion and the support hole portion and the second fixing member inserted in the second hole portion and the intermediate member hole portion, and wherein the direction of the first load acting on the first hole portion of the first coupling section due to the moving member being pulled toward the leading end side in the length direction and the direction of the second load acting on the second hole portion of the second coupling section due to the moving member being pulled toward the leading end side in the length direction are the same as the extending direction of the single imaginary line L1.

2. The buckle device of claim 1, wherein:

a first coupled portion of the first coupling section where the first load acts and a second coupled portion of the second coupling section where the second load acts, due to the moving member being pulled toward the leading end side in the length direction, are single in the first coupling section and the second coupling section respectively, and the second coupled portion is disposed in the direction of the first load acting on the first coupled portion with respect to the first coupled portion.

3. The buckle device of claim 1, wherein at least one of the first coupling section or the second coupling section includes a plurality of portions where loads act respectively due to the moving member being pulled toward the leading end side in the length direction, and a direction of a resultant force of the loads at the respective plurality of portions is along a direction of load applied from the moving member to the intermediate member.

4. The buckle device of claim 1, wherein the first load acts on a first coupled portion of the first coupling section, the first coupled portion and a coupled portion of the vehicle side support section being coupled, the second load acts on a second coupled portion of the second coupling section, the second coupled portion and a coupled portion of the intermediate member being coupled, and the imaginary line L1 passes through the first coupled portion and the second coupled portion.

5. The buckle device of claim 4, wherein the first coupling section and the second coupling section configure a single member as the coupling member.

6. The buckle device of claim 4, wherein an angle formed by the imaginary line L1 and an extending direction of the base end side portion of the movement member which is further toward a base end side of the moving member than the intermediate member is substantially ½ of an angle formed by an extending direction of a leading end side portion of the movement member which is further toward the leading end side than the intermediate member and the extending direction of the base end side portion of the movement member.

7. The buckle device of claim 3, wherein the imaginary line L1 is set such that an angle formed by the imaginary line L1 and an extending direction of the base end side portion of the movement member which is further toward a base end side of the moving member than the intermediate member is substantially ½ of an angle formed by an extending direction of a leading end side portion of the movement member which is further toward the leading end side than the intermediate member and the extending direction of the base end side portion of the movement member, the plurality of portions and coupled portions of at least one of the vehicle side support section or the intermediate member are coupled, the resultant force of the loads is on the imaginary line L1, and a direction of the resultant force of the loads is along the imaginary line L1.

* * * * *